July 28, 1959 A. N. OBES 2,896,548
FREIGHT TRANSFER TERMINAL AND TRANSFER DOLLY
Filed July 28, 1954 7 Sheets-Sheet 3

Inventor
Andrew N. Obes
by Roberts Cushman & Grover
Att'ys.

United States Patent Office 2,896,548
Patented July 28, 1959

2,896,548

FREIGHT TRANSFER TERMINAL AND TRANSFER DOLLY

Andrew N. Obes, New York, N.Y.

Application July 28, 1954, Serial No. 446,263

9 Claims. (Cl. 104—48)

This invention pertains to the transportation of freight partly by highway and partly by railway and by the use of vehicular means comprising a body for the reception of freight, means whereby the same body may become an essential part of a vehicle designed for highway travel or, alternatively, an essential part of a vehicle for railway travel, and relates more especially to a transfer station or terminal having facilities for the transformation of such a highway vehicle into a railway vehicle or vice versa.

According to the system of which this terminal is a part, the vehicle body is provided at opposite ends with kingpins designed to enter sockets in a tractor and in a road dolly respectively, each provided with wheels for use on the highway, or, alternatively, to enter sockets in a pair of spaced independent railway trucks or dollies having wheels for use on a railway track. The vehicle body is also provided, at a point substantially midway between its ends, with a socket at its underside designed for the reception of an upwardly directed kingpin carried by a transfer device or dolly which may be slid beneath the vehicle body and then so actuated as to lift the vehicle body from off of its wheeled supports and to move the body into a position such that, when it is again lowered, its kingpins will enter the sockets in the other set of wheeled supports.

Figure 1:
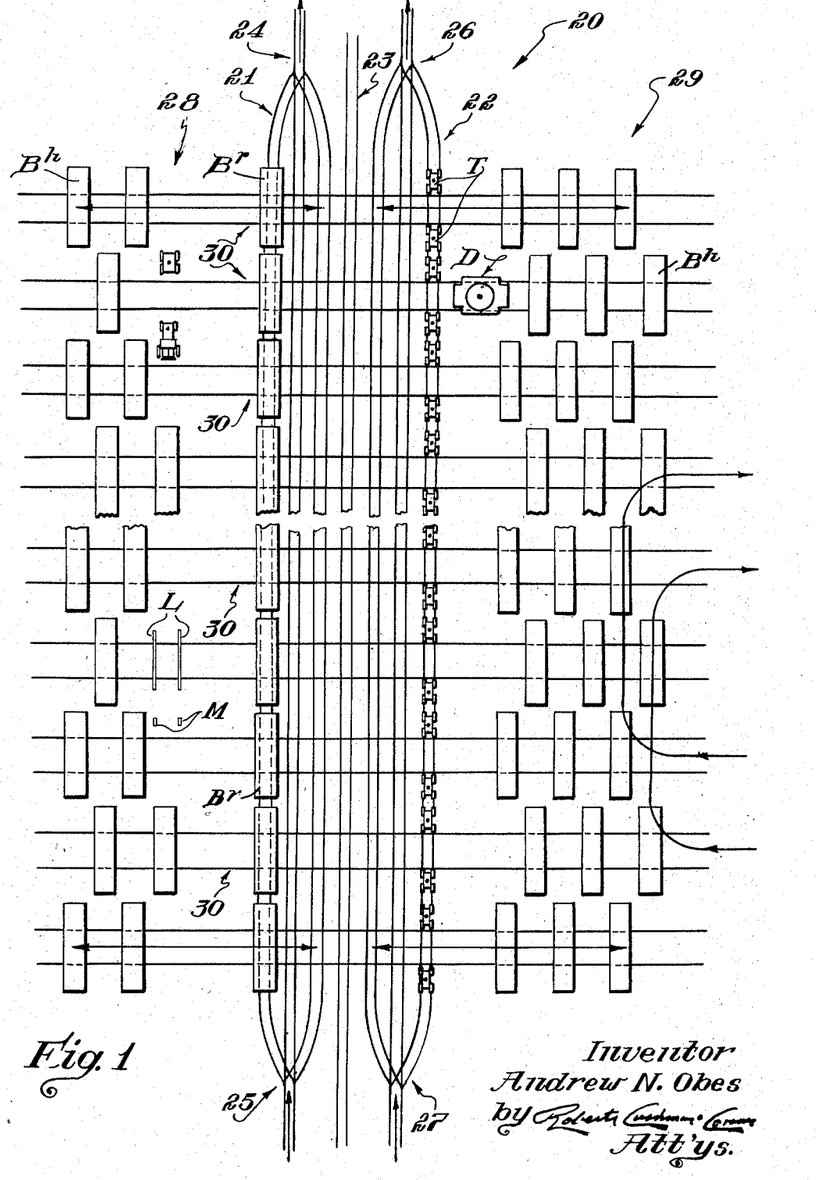

Objects of the invention are to provide a terminal including a novel transfer dolly so designed as to make possible the rapid shift of the vehicle body from one set of wheeled supports to the other. A further object is to provide a transfer station or terminal having a railway track and a parking ramp adjacent to the track and means for guiding the transfer dolly to move transversely across both railroad track and parking space. A further object is to provide a transfer station comprising a railway track and a transfer track at right angles thereto and a transfer dolly mounted on said transfer track and so devised that the transfer dolly may lift the vehicle body from off wheeled supports resting on the railway track and, after moving the vehicle body to one side of the track, may deposit the vehicle body on wheeled or other supports arranged at one side of the track and may then move to the opposite side of the railway track, receive a vehicle body from supports at the latter side of the track and move said body over the railway track and deposit it upon the aforesaid wheeled supports resing on the track. A further object is to provide a transfer terminal comprising a railway track with a parking ramp at one side of the track and a transfer device operative to elevate the vehicle body of a vehicle which has been standing on the parking ramp and to carry the body over the track and deposit it upon wheeled supports standing on the track, and to provide means whereby, while the body is so elevated, it may be oriented so that its longitudinal axis is accurately parallel to the railway rails. A further object is to provide a transfer station comprising a railway track and a parking ramp adjacent to the track and means for elevating the body of a vehicle which has been standing on the parking ramp and for moving the vehicle body over the railway track and to provide means which, while the body is so elevated, may be shifted lengthwise of the track to bring it into proper registry with wheeled supports resting on the railway track. Other and further objects and advantages of the invention will be pointed out in the following more detailed description and by reference to the accompanying drawings, wherein Fig. 1 is a small scale diagrammatic plan view of a transfer terminal illustrative of the principle of the invention;

It is contemplated that a terminal embodying the principles of the present invention may be made of any desired capacity, for example, to accommodate the handling of 8,000 trailer trucks per day. A terminal of such capacity would probably require twenty-one parallel railway tracks arranged for example, on ten foot centers, employing twenty of these twenty-one tracks for the parking of freight trains and using the twenty-first track, located at the center of the terminal, for emergency purposes. Each group of three tracks would be provided at each end of the terminal with a three-track switch layout connecting each group of three tracks to a single service track leading to the main line of the railway.

Arranged at each side of the group of parallel railway tracks there would be provided a ramp for the parking of trucks, each preferably being hard-surfaced and level at that portion adjacent to the group of railway tracks, and for a terminal of the capacity above suggested it would be desirable that each ramp be of a width, measured away from the outermost railway track at either side, to accommodate ten rows of trailers parked on twenty foot centers with the trailers in rows staggered relatively to each other. Such a staggered method of parking the trailers permits the tractor driver to pull his vehicle into the terminal parallel to the railway tracks, and then after leaving the vehicle body, to have sufficient room between his tractor and the vehicle parked in front to make the turn to pull out of the terminal. Allowing a length of thirty-seven feet between the center lines of couplings of adjacent railway vehicles, a train of one-hundred such vehicles would require a trackage thirty-seven hundred feet long, and thus the ramps at each side of the trackage would be of this length.

Arranged at right angles to the group of railway tracks there would be a plurality of wide gauge transfer tracks each comprising rails similar to railway rails, the rails of each transfer track being spaced apart a distance which might for example, be from twelve to fourteen feet, each transfer track extending across the entire group of railway rails and across the entire width of each ramp. Transfer dollies for moving the vehicle bodies from wheeled supports capable of traveling on the highway to wheeled supports capable of traveling on the railway tracks, or vice versa, would run on these transfer tracks, there being sufficient of the transfer tracks in the terminal so that each such dolly, for example, would service twenty trailer vehicles, with a capacity of, for example, eighty transfers per dolly per day. Obviously roadways of sufficient capacity should be provided leading to each ramp to permit the in and out movement of the trailer trucks without interference and the terminal may be of any desired length or width.

The terminal shown by way of example in Fig. 1, is of a lesser capacity than that above suggested, this terminal being designated generally by the numeral 20 and being shown as comprising two groups 21 and 22 of tracks, each group consisting of three parallel railway tracks of standard gauge, the two groups of tracks being spaced apart and having intervening between them a single track 23. These several railway tracks will be of standard gauge. At opposite ends of the terminal, the tracks of group 21 may be connected by appropriate switch means 24 and 25 respectively to single railway tracks leading to the main line of the railway, and in a similar way the three tracks of group 22 will be connected at opposite ends of the terminal by switch devices 26 and 27 to single tracks leading to the main line.

At the left and right-hand sides of the parallel railway tracks there are provided ramps 28 and 29 for the accommodation of the road vehicles, such vehicles, standing on the ramps, being designated by the character B$h$.

Figure 12:
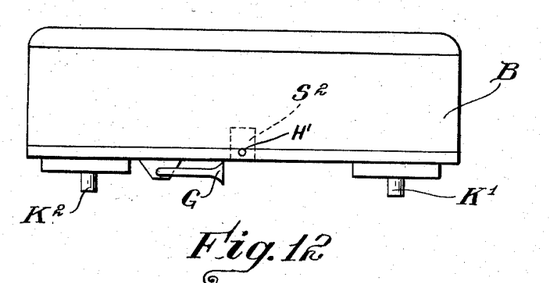
Fig. 12 is a diagrammatic side elevation of a vehicle body such as is employed in the practice of the invention.

The vehicle body which will be used in the practice of the present invention is diagrammatically illustrated in Fig. 12 where it is indicated by the character B and is shown as provided with downwardly projecting kingpins $K1$ and $K2$ near its opposite ends, respectively; a foldable landing gear G; and as having a socket S2 (indicated in dotted lines) midway between its ends for the reception of the upwardly projecting kingpin of the transfer dolly as hereafter described.

Preferably, the surfaces of the ramps (Fig. 1) will be provided with suitable marks, for example, parallel white lines L, indicating the proper locations of the road wheels of a vehicle when parked, and preferably also with white marks or spots M indicating the proper position for the landing gear which supports the forward end of the vehicle body, when the tractor which hauls the vehicle over the road has been disconnected from the body.

Extending transversely across the group of railway rails and across the entire width of each ramp are transfer tracks 30, nine such tracks being here illustrated. Each track comprises two parallel rails which may be similar to ordinary railway rails and arranged with their upper surfaces in the same plane as the upper surfaces of the rails of the tracks of groups 21 and 22, the transfer tracks being arranged parallel to each other and spaced apart on centers a distance at least equal to the length of the road vehicles to be serviced by the transfer terminal, for example a distance of the order of thirty-seven feet. Each of the transfer tracks supports a transfer dolly D which may move across the group of railway tracks from one ramp to the other, these dollies being operative to pick up the body from a road vehicle and to transfer it to a position above any selected one of the railway tracks and then to deposit the body on suitably positioned railway trucks resting on the selected track and designated by the character B$r$. Such railway vehicles, suitably coupled together may make up a train to which a locomotive may be coupled, the train then being pulled out of the transfer terminal and onto the main line for movement to its intended destination.

Figure 3:
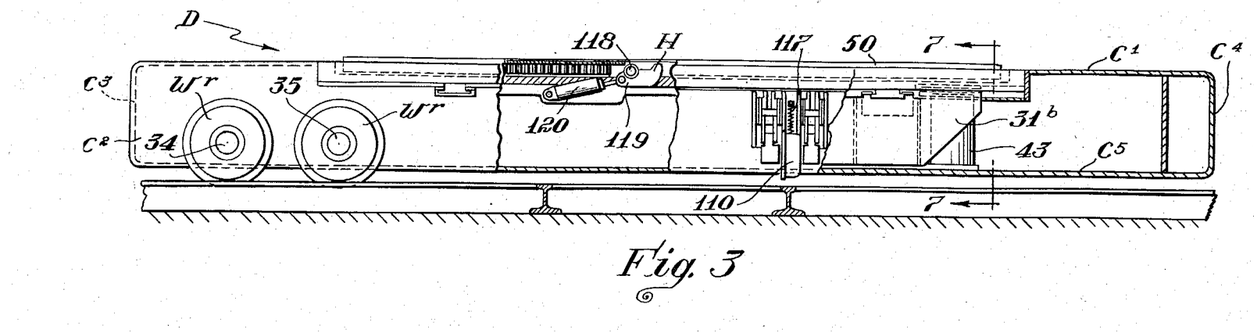
Fig. 3 is a diagrammatic side elevation of the transfer dolly, partly in vertical section.
Figure 11:
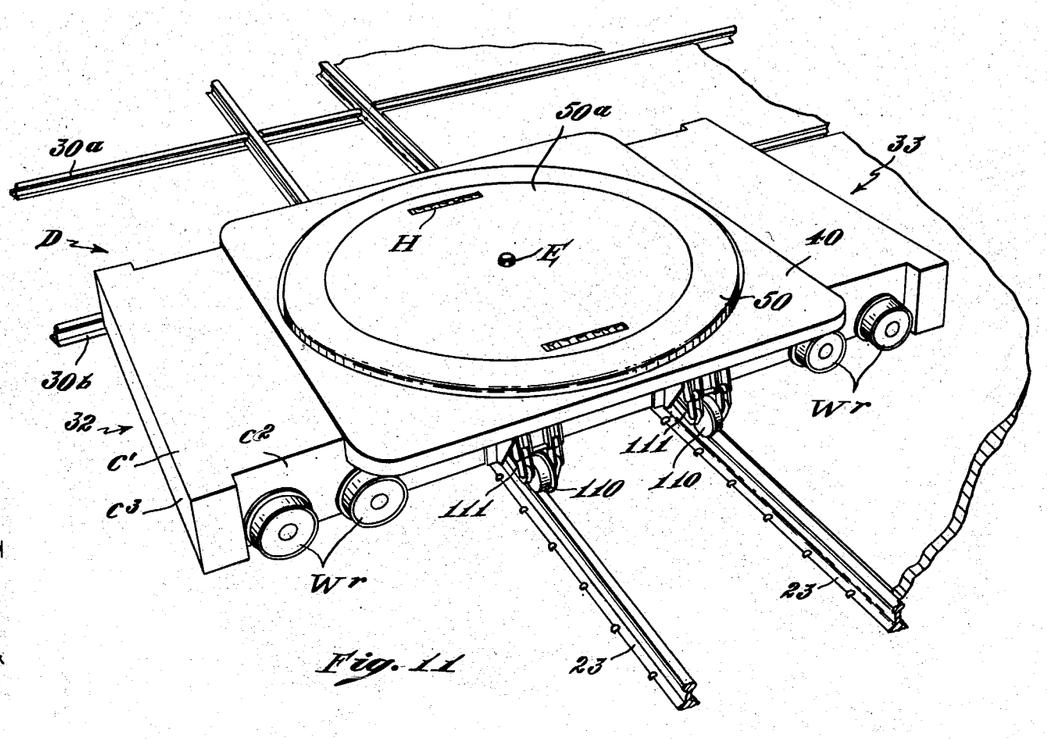
Fig. 11 is a diagrammatic perspective view showing the transfer dolly supported on a standard gauge railway track.

The transfer dolly D, Figs. 3 and 11 comprises a chassis of very rigid, box-like construction and of generally rectangular shape in plan. As illustrated, it comprises a top wall C', side walls C2, end walls C3 and C4 and intermediate vertical stiffening webs, some of which are shown at 31, 31$a$ and 31$b$ (Figs. 3, 6 and 7) and a bottom C5. In each end portion 32 and 33 of the chassis (Fig. 4) there are provided bearings for shafts 34, 34$a$, 35, 35$a$ to whose outer ends conventional railway wheels W$r$ are secured. If desired, the shafts 34 and 34$a$ and 35 and 35$a$ may be integral, extending from one side of the chassis to the other, but in order to permit the axes of the wheels to be located at a low level, the arrangement shown in Fig. 4 may be employed, wherein the inner ends of the shafts 34, 34$a$, etc. are connected by universal joints to shafts 36 and 37 which are driven by electric motors 38, 39 mounted within the chassis of the dolly. Assuming that current will be supplied to these motors, the dolly can thus be propelled by power back and forth along the transfer tracks 30. The rails constituting one of these tracks are indicated at 30$a$ and 30$b$ respectively, Fig. 5.

The top wall C' of the chassis is depressed (Fig. 5) at the midportion of the chassis to provide a cavity for the reception of a transversely movable substantially square supporting plate 40 forming a part of a vertically movable elevator structure. This elevator structure comprises longitudinally extending vertical webs arranged at opposite sides of the chassis, said webs being connected by transverse members to form a rigid structure which is supported by four hydraulic cylinders 41, 42, 43 and 44 (Fig. 4) located below the respective corners of the plate 40. The elevator structure carries four pairs of transversely extending parallel guide members 47, 47$a$ (Fig. 6) which receive between them rails 46 of inverted T-shape fixed to the underside of the plate 40, the latter thus being movable transversely of the elevator structure. A suitable hydraulic pump 45 (Fig. 4) is provided for supplying the hydraulic fluid under pressure to the elevator cylinders. Suitable valve means, for example such as disclosed in the patent to Coyle, No. 955,982, April 26, 1910, is provided for insuring the supply of fluid to the several elevator cylinders in the proper amounts to insure that the plate 40 will remain accurately horizontal in rising or falling. When the elevator structure is in its lowest position, the upper surface of the plate 40 is substantially flush with the upper surface C' of the end portion of the top wall of the chassis.

Hydraulic cylinders 48 (Fig. 4), also supplied with fluid by the pump 45, are arranged to move the plate 40 transversely of the dolly, the rails 46 sliding along between the guides 47, 47$a$ carried by the elevator structure. A total movement of the plate 40 of approximately one foot from its central position in either direction is considered sufficient for the desired purpose.

Figure 4:
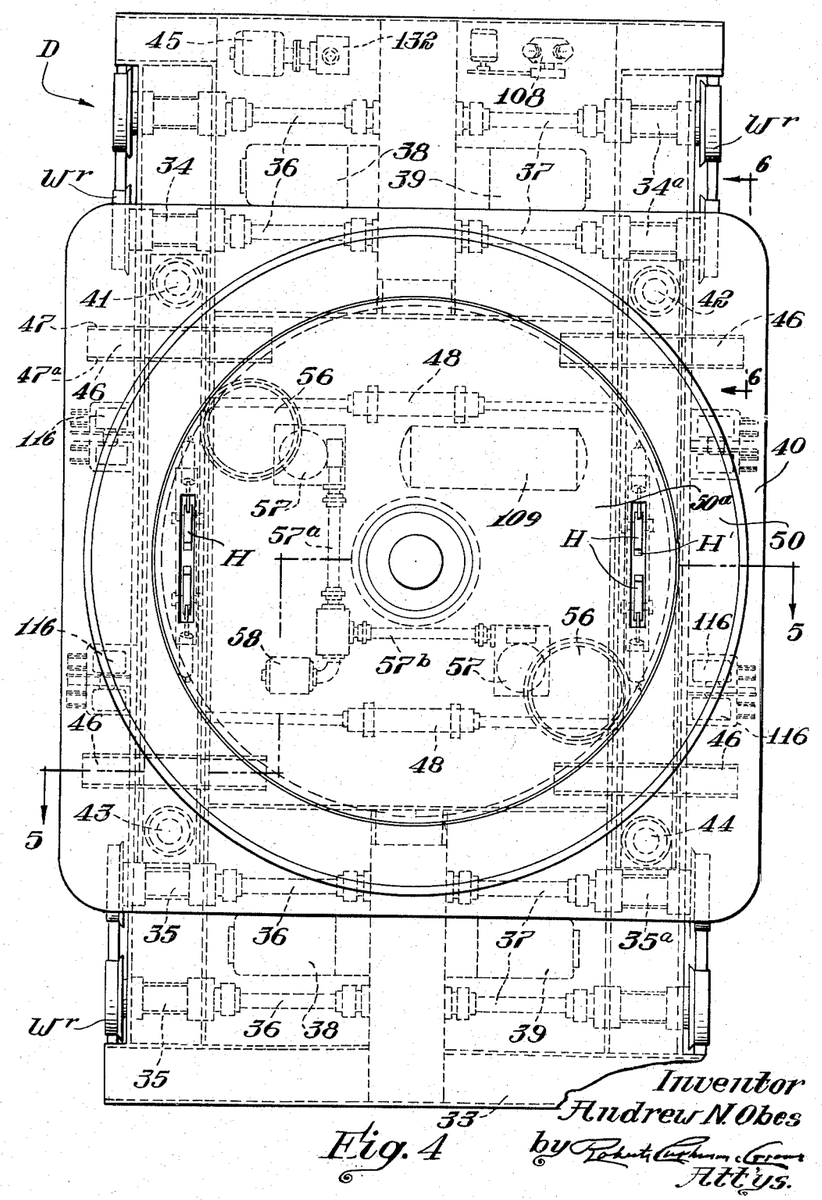
Fig. 4 is a diagrammatic plan view of the transfer dolly to substantially the same scale as Fig. 3.
Figure 5:
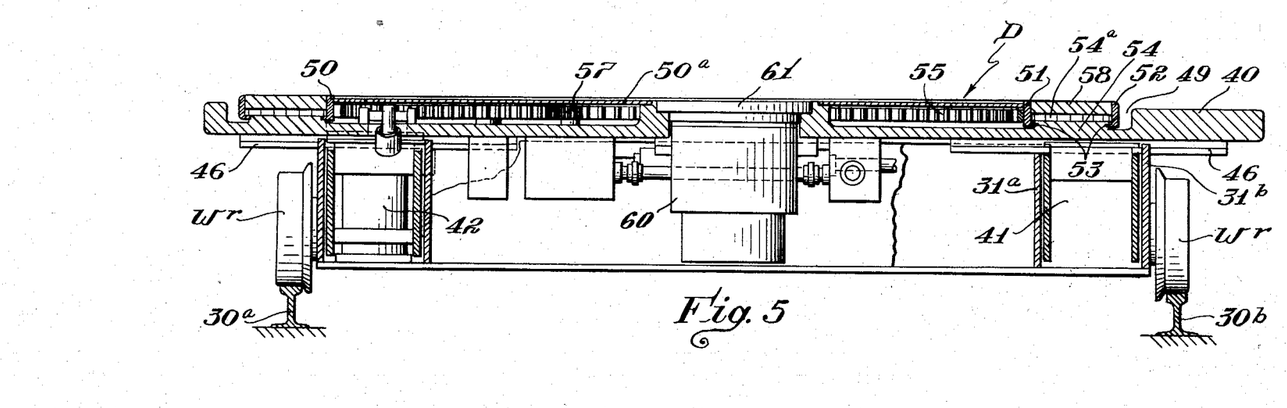
Fig. 5 is a vertical section on the line 5—5 of Fig. 4.
Figure 6:
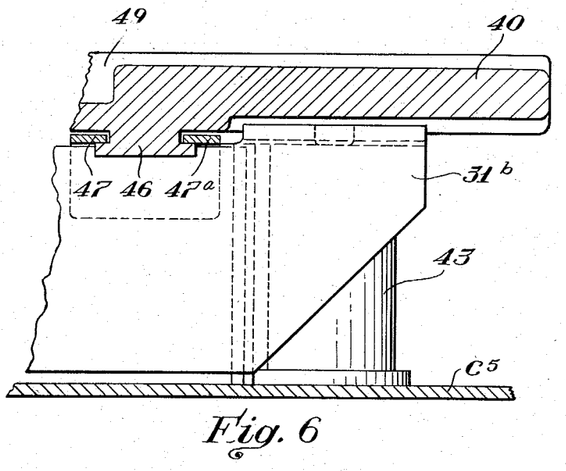
Fig. 6 is a fragmentary vertical section, to larger scale, substantially on the line 6—6 of Fig. 4.
Figure 7:
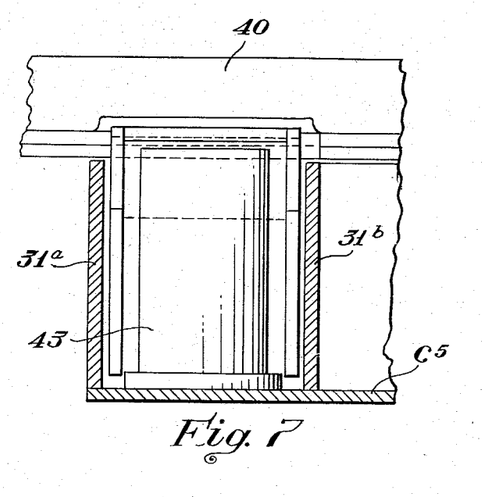
Fig. 7 is a fragmentary vertical section, to larger scale, substantially on the line 7—7 of Fig. 3.

The central part of the plate 40 is downwardly recessed as indicated at 49, Figs. 5 and 6, to provide a circular cavity for the reception of the turntable 50 (Figs. 4 and 11). The turntable 50 is a heavy rigid annulus interposed between and fixed to inner and outer rings 51 and 52 (Fig. 5) which are provided at their lower edges with inwardly directed flanges 53 which slide in circumferential grooves in the inner and outer peripheral surfaces of an elevated annular portion 54 of the plate 40. Interposed between the underside of the annulus 50 and the top surface of the part 54, are suitable antifriction elements 54$a$, for example ball bearings. The inner ring 51 is provided at its inner face (Fig. 5) with the teeth 55 of an internal gear which meshes, at diametrically opposite points, with gears 56 (Fig. 4) which mesh with pinions 57 which are driven by shafts 57$a$, 57$b$ which, in turn, are driven through an interposed reduction gearing by a motor 58. An annular cover plate 50$a$ rests upon the upper edge of the internal gear. At its central part, the plate 40 is provided with a circular opening for the reception of the tubular housing 60 (Fig. 8) for the kingpin E which is designed to engage the socket S2 in the bottom of the vehicle body. This housing 60 is here shown (Fig. 8) as a hollow cylindrical casing having a radial flange 61 at its upper end which seats in a suitable recess in the upper surface of the plate 40 and which is secured to the plate 40 by means of screws 62. Seated in a groove at the upper end of the housing 60 is a bearing bushing 63 forming an upper bearing for the vertically slidable kingpin E. The kingpin E (Fig. 8) as here illustrated comprises a sleeve 64, for example a casting, preferably provided at its upper portion with a tubular jacket 65 of bearing metal designed to slide in contact with the bushing 63. A ring 66 is secured to the lower edge of the sleeve 64 by screws 67, this ring having an inner edge surface which has a sliding-fit engagement with the outside of a stationary centering sleeve 68. The outer edge of ring 66 is grooved for the reception of packing, and has a sliding fit against the inner surface of the stationary cylindrical housing 60. The lower end of the centering sleeve 68 is seated tightly within a circular opening in a plate 69 whose outer edge portion is clamped by a removable ring 70 to a heavy rigid bottom member 71 which fits within the lower end of the kingpin housing 60 and which is fixed in position relatively to the housing.

A closure plug 72 fits within the upper end of the kingpin 64, the upper portion of this plug 72 being of the same external diameter as the member 65 but tapering upwardly to provide a beveled surface 73 which intersects a horizontal top surface 74. The kingpin E comprises a tubular part 75 whose outer cylindrical surface is spaced from the inner surface of the sleeve 64. This part 75 is integrally united to the sleeve 64 by one or more webs 76, thus defining annular chambers 77 and 78 within the kingpin housing. The upper of these chambers extends up into the closure plug 72 as shown at 77a and is sealed at its top by a ring 79 of insulating material secured to the plug 72 by screws 80. The internal tubular part 75 of the kingpin housing is provided with an upward extension 75a having an axial bore 81 whose upper end is enlarged in diameter at 82 to form a socket for the reception of the lower end of a rigid conduit which is fixed within and coaxial with the socket S2 in the underside of the vehicle body. A resiliently yieldable packing ring 85, held in place by a screw-threaded ring 86 provides a leak-tight connection between the parts 75a and 84 when said parts are assembled. A pipe 87, coaxial with the bore 81, has screw-threaded engagement at its lower end with a bore in the bottom member 71, while its upper portion extends up into the bore 81, the upper portion of this pipe 87 being surrounded by a packing ring 88 which is held under compression by a gland 89 and a screw-threaded follower ring 90. The bottom member 71 is provided with a passage 91 with which one end of a pipe 92 communicates. A pipe 93 has screw-threaded engagement with an opening in the wall of the housing 60, this opening leading into the chamber 94 between the housing 60 and the centering sleeve 68 and below the ring 66. Another pipe 95 passes through an opening in the wall of the housing 60 and opens into the space 96 between the inner surface of the housing 60 and the outer surface of the part 64 at a point above the ring 66.

Figure 8:
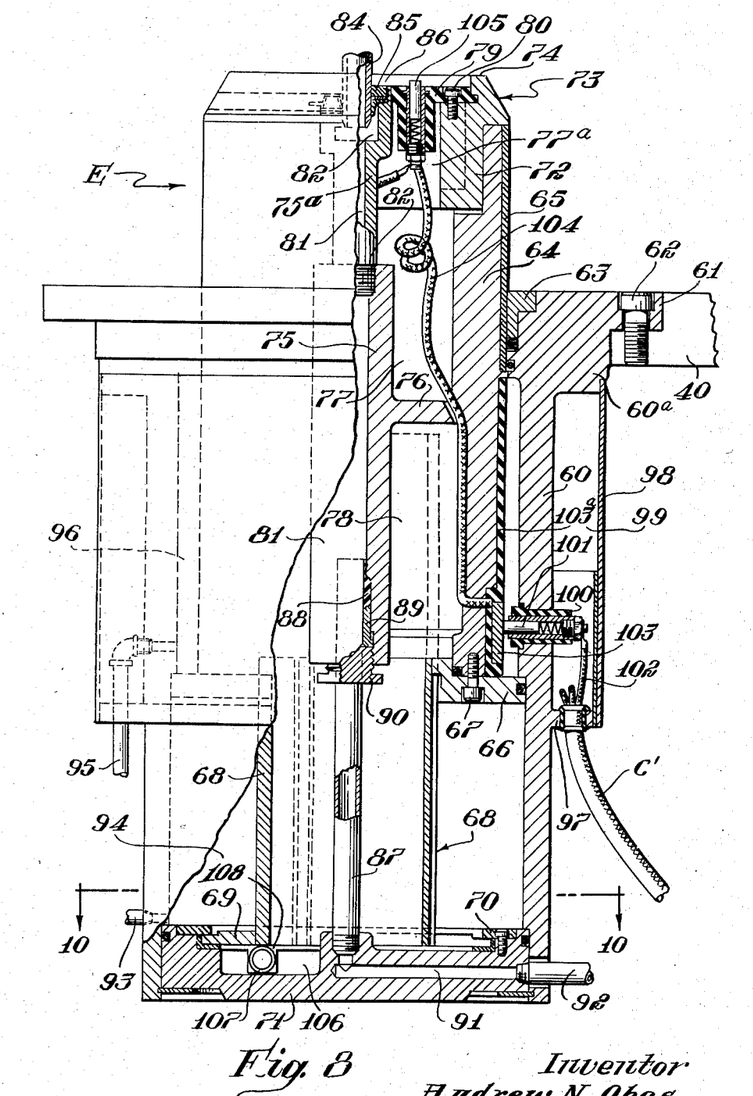
Fig. 8 is a fragmentary diametrical section, to larger scale than Fig. 5, showing details of the kingpin assembly of the transfer dolly.
Figure 9:
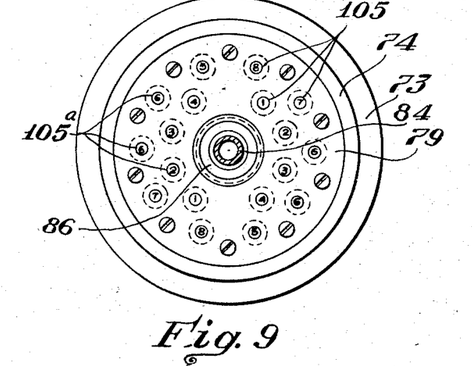
Fig. 9 is a plan view of the kingpin separate from other parts.

The housing 60 is provided with an external horizontal flange 97 which forms centering means for the lower end of an outer jacket 98 whose upper edge portion is seated in a recess in the outer surface of the upper part 60a of the housing 60, thus providing an annular space 99 between the jacket 98 and the outer surface of the housing 60. A bushing 100 of insulating material is fixed with an opening in the wall of the housing 60 and within this bushing is arranged a brush 101 which is urged inwardly by a spring and which is connected electrically to a conductor 102 which extends up through an opening in the flange 97. While but one of the brushes 101 is here shown, there is a second like brush, arranged at the diametrically opposite side of the housing 60, and supplied with current from the same source as the conductor 102. A sleeve 103a of insulating material forms a jacket for the part 64, below the lower edge of the jacket 65. A ring 103 of electrical conducting material is seated in a peripheral recess in the sleeve 103a and is contacted by the brush 101 when the kingpin is in its elevated, operative position as shown in Fig. 8. A flexible conductor 104 is connected at its lower end to this ring 103 and extends up through a hole in the web 76 and through the chamber 77 and has its upper end electrically connected to a brush 105 which is guided to slide up and down in an insulating member 79 which is set into a hole in the top of plug 72. There are eight of these brushes 105 arranged at one side of a diameter of the kingpin, as shown in Fig. 9, all electrically connected to the same electrical conductor 104. At the opposite side of said diameter of the kingpin is a second group of eight. By providing two like groups of brushes 105 and 105a, disposed at diametrically opposite sides of the kingpin, it makes no difference whether the vehicle body be headed in one direction or the other when the kingpin enters the socket S2, since in either case there will be a properly arranged group of brushes on the upper end of the kingpin for cooperation with contacts arranged in the bottom of the socket S2.

Figure 10:
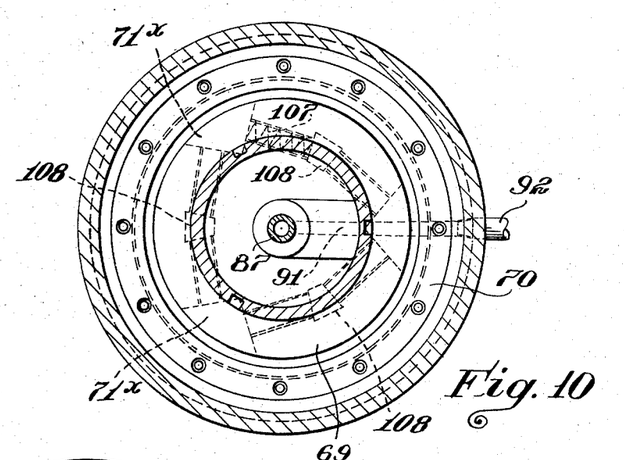
Fig. 10 is a section substantially on the line 10—10 of Fig. 8.

Within a cavity 106 in the bottom member 71, compression springs 107, are arranged, said springs being interposed between fixed abutment surfaces 71x on the part 71 and lugs 108 projecting down from the part 69 (Figs. 8 and 10). These springs are so arranged that the kingpin may rotate in one direction or the other from its normal position through an arc of approximately 5° but when permitted to do so will return to its normal position by the action of springs 107.

An air compressor 108 (Fig. 4) within the chassis maintains a supply of compressed air in a tank 109 and when, by the opening of a suitable valve compressed air is admitted through the pipe 93 (Fig. 8) into the chamber 94, the air acts against the underside of the ring 66, which functions as a piston head, to raise the kingpin to the position shown in Fig. 8, and when, on the other hand, compressed air is admitted through the pipe 95 it acts on the upper surface of the ring 66 to move the kingpin downwardly in the housing 60.

When the kingpin is lowered so that the ring 103 no longer engages the brush 101, no current is supplied to the brushes 105 or 105a, and thus until the upper part of the kingpin E is safely entered into the socket S2 of the vehicle body there is no danger from exposed live contacts.

Figure 2:
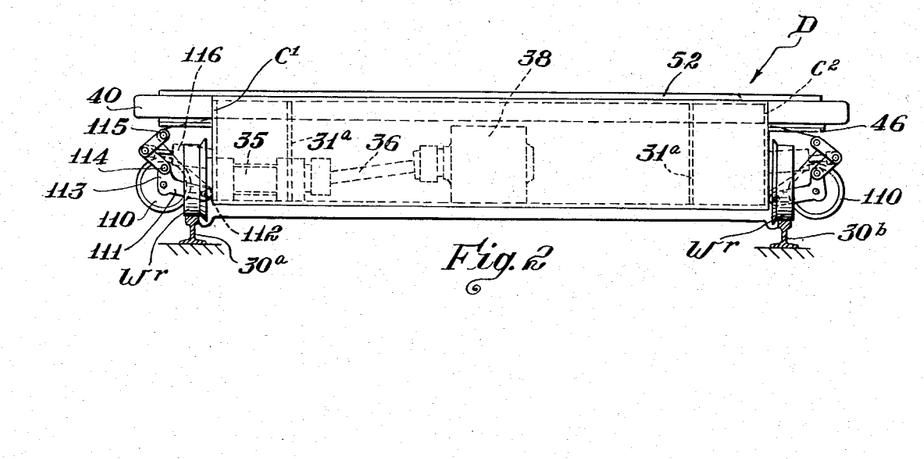
Fig. 2 is an end elevation to larger scale than Fig. 1, showing a novel transfer dolly forming an essential part of the transfer terminal.

Since it may be desirable to shift a transfer dolly from one of the transfer tracks 30 to another, provision is made for moving the dolly along one of the standard gauge railway tracks, for example, the center track 23. For this purpose, the chassis of the dolly is provided at each of its opposite sides with a pair of wheels 110 (Figs. 2, 3 and 11) which are normally held in elevated position, as shown in Fig. 2, but which may be forced down into position to engage the rails of the standard gauge track 23 and to carry the weight of the chassis. To enable this to be done the journal of each wheel 110 is mounted to turn in bearings at the elbows of two spaced bell crank levers, each lever (Fig. 2) having a long arm 111 pivoted at the point 112 to the chassis and having a short arm 113 pivoted at 114 to the lower of a pair of toggle links, the upper link of each pair being pivoted to the chassis at 115 and the proximate ends of the links of each pair being pivotally journaled to a piston rod having a piston which slides in a cylinder 116 (Fig. 4) to which compressed air may be admitted from the tank 109 by manipulation of a suitable valve. If the dolly is to be shifted from one track 30 to another, it is first moved so that it stands directly above the railway track 21 for example, with its wheels 110 directly above the rails of said track. Pressure fluid is then admitted into all of the cylinders 116 thus swinging the bell crank levers so as to move the wheels 110 down into contact with the rails of the track 21, with force sufficient to lift the entire chassis and cause the wheels 110 to carry the whole weight of the chassis. The dolly may now be moved along the track 21 to the desired position where its wheels Wr are directly above the tracks of another of the transverse tracks 30. Air is now released from the cylinders 116 and the chassis sinks down until its wheels Wr engage the rails 30a, 30b of the track 30. Springs 117 may be provided to assist in raising the wheels 110 to their inoperative position as the air is exhausted from the cylinders 116. Since during the transfer of the vehicle body from the road wheels to the rail wheels and vice versa the body is supported at its central portion only, that is to say, at an area concentric with the kingpin of the dolly, it is desirable to provide means to prevent the vehicle body from rocking relatively to the dolly while being transferred. For this purpose pairs of hook devices H (Fig. 3) are arranged at opposite sides of the dolly. Each hook H is normally located in a slot H' (Fig. 4) in the annular cover plate 50a, being pivoted at 118 to a part carried by the elevator structure. Each hook also has an arm 119 which is pivotally connected to a piston rod carrying a piston which slides in a cylinder 120. The bottom of the vehicle body is provided with elements for engagement by the hooks H when the latter are swung up through slots H' to elevated position. After the kingpin of the dolly has been inserted in the socket of the vehicle body, pressure fluid is admitted to the several cylinders 120, thus swinging the hooks H upwardly and into engagement with the complemental parts for example pins H' (Fig. 12) carried by the vehicle body, thus securely attaching the vehicle body to the annulus 54 and holding it firmly in position during the transfer operation. While as hereinabove described, the operation of the various control valves has been indicated as manual, it is contemplated that the terminal may comprise electrical equipment, including automatic controls of electronic type whereby the various steps involved in the transfer of a vehicle body between the highway and railway dollies, as well as other operations involved in the coupling of railway dollies and the proper servicing of brake supply tanks, lighting, heating or refrigerating units will all be automatically controlled and in a predetermined sequence. At certain stages in the transfer operation and while the vehicle body is supported in elevated position by the transfer dolly, the landing gear G must be actuated and the vehicle body must be disengaged from the road dolly. To accomplish this, the kingpin of the transfer dolly is provided with the socket 82 and with the electrical contacts 105 designed to engage complemental elements in the socket of the vehicle body.

While one desirable embodiment of the invention has herein been disclosed by way of example, it is to be understood that any or all equivalents, within the terms of the appended claims are considered to be within the purview of the invention.

I claim:

1. Apparatus, for use in transferring an elongate vehicle body, provided with downwardly directed kingpins near its opposite ends, respectively, each designed to be received in a socket in a wheeled support, and wherein the vehicle body has a socket at its underside substantially midway between its ends, from one pair of wheeled supports to another pair of wheeled supports, said apparatus comprising, in combination, a wheeled chassis of a normal maximum height such that it may be moved beneath the vehicle body in the space between the wheeled supports, motor means carried by the chassis for moving it from place to place, the chassis comprising a flat top member having therein a well in which is fixed a kingpin housing, a kingpin, whose upper portion is shaped to fit within the socket in the vehicle body, arranged to slide vertically within the housing, and means operative to project said kingpin, from a position where its upper end is substantially flush with the upper surface of the flat top member of the chassis, upwardly into the socket of a vehicle body positioned directly above the chassis, the upper end of the vertically movable kingpin having a socket for the reception of the lower end of a rigid conduit projecting downwardly from the central part of the socket in the underside of the vehicle body, the vertically movable kingpin being hollow and having telescopic parts providing a fluid passage leading from the socket in the upper end of said kingpin to a chamber in the lower end of the kingpin housing.

2. Apparatus, according to claim 1, wherein the kingpin is rotatable within the kingpin housing, and means, including opposed spring elements, operative to permit limited rotation of the kingpin in either direction from a normal central position but tending to restore the kingpin to its central position.

3. Apparatus, for use in transferring an elongate vehicle body (devoid of permanently attached wheels) from a set of independent wheeled supports designed to travel along the highway to a set of independent wheeled supports designed to travel on a railway track, or vice versa, the vehicle body having kingpins adjacent to its opposite ends designed to enter sockets in the respective wheeled supports of a set and having a socket at its underside substantially midway between its ends for cooperation with a transfer dolly, said apparatus comprising a chassis of rigid box-like construction comprising side and top walls and of a normal maximum height such that it may be moved beneath the vehicle body in the space between the front and rear wheeled supports, said chassis being substantially rectangular in horizontal section and having bearings adjacent to its opposite ends for shafts to which railway wheels are secured whereby the chassis is normally supported by said wheels and may be moved along railway rails, the top wall of the chassis having a cavity therein for the reception of a plate forming the top member of an elevator structure, the latter comprising a guide frame on which the plate may move transversely of the chassis, the elevator structure also including hydraulic cylinders by means of which the guide frame may be raised or lowered, the top plate of the elevator structure having a cylindrical cavity, and a turntable arranged within said cavity, means for moving the plate transversely of the chassis and means for turning the turn-table, the turn-table having a central opening, a housing for a kingpin fixed within said opening, and a kingpin within said housing, the kingpin being of a size and shape to fit within the socket in the underside of the vehicle body.

4. Apparatus, according to claim 3, wherein the railway wheels of each pair of those upon which the chassis is normally supported are spaced apart a distance substantially as great as the length of the vehicle body for cooperation with rails widely spaced apart and a second set of pairs of railway wheels, the wheels of each pair of the latter set being spaced apart to travel on a standard gauge railway track, means normally holding the wheels of the second set in elevated inoperative position, and means for depressing the wheels of the second set until they support the entire weight of the chassis.

5. Apparatus, according to claim 3, wherein the turntable comprises an annular plate interposed between inner and outer cylindrical rings, the rings having portions which slide in grooves in the top plate of the elevator structure, the inner of said rings carrying an internal gear, a pinion meshing with said gear, and motor means carried by the chassis for turning said pinion.

6. Apparatus, according to claim 3, wherein the housing for the kingpin of the transfer dolly is a hollow cylindrical casing having a radial flange at its upper end which seats in a recess in the upper surface of the top plate of the elevator structure, and guide means carried by the housing, the kingpin being vertically slidable in said guide means.

7. Apparatus, according to claim 3, wherein the kingpin comprises a sleeve provided at its upper portion with a wear-resistant jacket which contacts the guide means of the kingpin housing.

8. Apparatus, according to claim 3, wherein the kingpin is provided with a portion constituting a piston head, and means for admitting pressure fluid to act alternatively on opposite sides of the piston head thereby to move the kingpin up or down relatively to the housing.

9. Apparatus, according to claim 3, wherein the kingpin carries electrical contacts, and switch means, automatically operative, to prevent current from reaching said contacts until the kingpin has been seated within the socket at the underside of the vehicle body.

References Cited in the file of this patent

UNITED STATES PATENTS

| Number | Name | Date |
|---|---|---|
| 335,483 | Samuel | Feb. 2, 1886 |
| 359,077 | Hord | Mar. 8, 1887 |
| 633,235 | Dunn | Sept. 19, 1899 |
| 701,207 | Ludlow | May 27, 1902 |
| 781,624 | Sterling | Jan. 31, 1905 |
| 804,975 | Porter | Nov. 21, 1905 |
| 1,017,290 | Ham et al. | Feb. 13, 1912 |
| 1,114,975 | Fessenden | Oct. 27, 1914 |
| 1,414,998 | Allen | May 2, 1922 |
| 1,416,589 | Wallace | May 16, 1922 |
| 1,460,325 | Eagelston | June 26, 1923 |
| 1,466,296 | Fitch | Aug. 28, 1923 |
| 1,551,890 | Luce | Sept. 1, 1925 |
| 1,776,884 | Carpenter | Sept. 30, 1930 |
| 1,869,046 | Buck | July 26, 1932 |
| 1,897,277 | Reinhart et al. | Feb. 14, 1933 |
| 1,973,605 | Buettell et al. | Sept. 11, 1934 |
| 1,994,815 | Ferrin | Mar. 19, 1935 |
| 2,047,956 | Fitch | July 21, 1936 |
| 2,102,844 | Hester | Dec. 21, 1937 |
| 2,107,292 | Fitch | Feb. 8, 1938 |
| 2,121,181 | Bayerl | June 21, 1938 |
| 2,197,375 | Dafnis | Apr. 16, 1940 |
| 2,263,578 | Hickman | Nov. 25, 1941 |
| 2,292,763 | Lennox | Aug. 11, 1942 |
| 2,321,253 | Schellentrager | June 8, 1943 |
| 2,401,592 | Stocker | June 4, 1946 |
| 2,633,251 | Bruce | Mar. 31, 1953 |
| 2,655,115 | Holderman et al. | Oct. 13, 1953 |
| 2,734,716 | Peaine | Feb. 14, 1956 |
| 2,762,315 | Talboys | Sept. 11, 1956 |
| 2,787,971 | Obes | Apr. 9, 1957 |

FOREIGN PATENTS

| Number | Country | Date |
|---|---|---|
| 22,834 | Australia | June 11, 1936 |
| 311,311 | Germany | Mar. 17, 1919 |